(12) United States Patent
Chen et al.

(10) Patent No.: US 7,376,181 B2
(45) Date of Patent: May 20, 2008

(54) TRANSPOSED STRUCTURE FOR A DECISION FEEDBACK EQUALIZER COMBINED WITH A TRELLIS DECODER

(75) Inventors: Shidong Chen, Palatine, IL (US); Jilian Zhu, Palatine, IL (US); Xiaojun Yang, Palatine, IL (US)

(73) Assignee: Micronas Semiconductors, Inc., Palatine, IL (US)

( * ) Notice: Subject to any disclaimer, the term of this patent is extended or adjusted under 35 U.S.C. 154(b) by 476 days.

(21) Appl. No.: 10/407,610

(22) Filed: Apr. 4, 2003

(65) Prior Publication Data

US 2004/0013191 A1    Jan. 22, 2004

Related U.S. Application Data

(60) Provisional application No. 60/370,380, filed on Apr. 5, 2002, provisional application No. 60/370,413, filed on Apr. 5, 2002.

(51) Int. Cl.
*H03K 5/159* (2006.01)
(52) U.S. Cl. .................................. 375/233; 375/229
(58) Field of Classification Search ............... 375/233, 375/265, 262, 229
See application file for complete search history.

(56) References Cited

U.S. PATENT DOCUMENTS

| | | | |
|---|---|---|---|
| 4,567,599 A | 1/1986 | Mizoguchi | |
| 4,712,221 A | 12/1987 | Pearce et al. | |
| 4,815,103 A | 3/1989 | Cupo et al. | |
| 4,833,693 A | 5/1989 | Eyuboglu | |
| 4,856,031 A | 8/1989 | Goldstein | |
| 4,866,395 A | 9/1989 | Hostetter | |
| 4,989,090 A | 1/1991 | Campbell et al. | |
| 5,052,000 A | 9/1991 | Wang et al. | |
| 5,056,117 A | 10/1991 | Gitlin et al. | |
| 5,058,047 A | 10/1991 | Chung | |
| 5,127,051 A | 6/1992 | Chan et al. | |
| 5,134,480 A | 7/1992 | Wang et al. | |
| 5,142,551 A | 8/1992 | Borth et al. | |
| 5,210,774 A | 5/1993 | Abbiate et al. | |
| 5,278,780 A | 1/1994 | Eguchi | |
| 5,311,546 A | 5/1994 | Paik et al. | |
| 5,453,797 A | 9/1995 | Nicolas et al. | |

(Continued)

FOREIGN PATENT DOCUMENTS

EP    0 524 559 B1    5/1997

(Continued)

OTHER PUBLICATIONS

De Haan et al. " DeInterlacing-an Overview", Proceedings of the IEEE, vol. 86, No. 9, pp. 1837-1856 (Sep. 1998).

(Continued)

*Primary Examiner*—Mohammed Ghayour
*Assistant Examiner*—Leila Malek
(74) *Attorney, Agent, or Firm*—O'Shea, Getz & Kosakowski. P.C.

(57) ABSTRACT

A DFE comprises a trellis decoder and a plurality of sub-filter pipelines. Each of the plurality of sub-filter pipelines is fed intermediate decoded symbols of one of the stages in a trace-back chain of a current decoding bank. The DFE output is formed by summing the plurality of sub-filter pipelines.

5 Claims, 4 Drawing Sheets

U.S. PATENT DOCUMENTS

| | | | |
|---|---|---|---|
| 5,471,508 | A | 11/1995 | Koslov |
| 5,506,636 | A | 4/1996 | Patel et al. |
| 5,508,752 | A | 4/1996 | Kim et al. |
| 5,532,750 | A | 7/1996 | De Haan et al. |
| 5,537,435 | A | 7/1996 | Carney et al. |
| 5,568,098 | A | 10/1996 | Horie et al. |
| 5,568,521 | A | 10/1996 | Williams et al. |
| 5,588,025 | A | 12/1996 | Strolle et al. |
| 5,619,154 | A | 4/1997 | Strolle et al. |
| 5,648,987 | A | 7/1997 | Yang et al. |
| 5,668,831 | A | 9/1997 | Claydon et al. |
| 5,692,014 | A | 11/1997 | Basham et al. |
| 5,757,855 | A | 5/1998 | Strolle et al. |
| 5,781,460 | A | 7/1998 | Nguyen et al. |
| 5,789,988 | A | 8/1998 | Sasaki |
| 5,802,461 | A | 9/1998 | Gatherer |
| 5,805,242 | A | 9/1998 | Strolle et al. |
| 5,828,705 | A | 10/1998 | Kroeger et al. |
| 5,835,532 | A | 11/1998 | Strolle et al. |
| 5,862,156 | A | 1/1999 | Huszar et al. |
| 5,870,433 | A | 2/1999 | Huber et al. |
| 5,872,817 | A | 2/1999 | Wei |
| 5,877,816 | A | 3/1999 | Kim |
| 5,894,334 | A | 4/1999 | Strolle et al. |
| 5,995,154 | A | 11/1999 | Heimburger |
| 6,005,640 | A | 12/1999 | Strolle et al. |
| 6,034,734 | A | 3/2000 | De Haan et al. |
| 6,034,998 | A | 3/2000 | Takashi et al. |
| 6,044,083 | A | 3/2000 | Citta et al. |
| 6,069,524 | A | 5/2000 | Mycynek et al. |
| 6,133,785 | A | 10/2000 | Bourdeau |
| 6,133,964 | A | 10/2000 | Han |
| 6,141,384 | A | 10/2000 | Wittig et al. |
| 6,145,114 | A | 11/2000 | Crozier et al. |
| 6,154,487 | A | 11/2000 | Murai et al. |
| 6,178,209 | B1 | 1/2001 | Hulyalkar et al. |
| 6,195,400 | B1 | 2/2001 | Maeda |
| 6,198,777 | B1 | 3/2001 | Feher |
| 6,219,379 | B1 | 4/2001 | Ghosh |
| 6,222,891 | B1 | 4/2001 | Liu et al. |
| 6,226,323 | B1 | 5/2001 | Tan et al. |
| 6,233,286 | B1 | 5/2001 | Wei |
| 6,240,133 | B1 | 5/2001 | Sommer et al. |
| 6,249,544 | B1 | 6/2001 | Azazzi et al. |
| 6,260,053 | B1 | 7/2001 | Maulik et al. |
| 6,272,173 | B1 | 8/2001 | Hatamian |
| 6,275,554 | B1 | 8/2001 | Bouillet et al. |
| 6,278,736 | B1 | 8/2001 | De Haan et al. |
| 6,304,614 | B1 | 10/2001 | Abbaszadeh et al. |
| 6,307,901 | B1 | 10/2001 | Yu et al. |
| 6,333,767 | B1 | 12/2001 | Patel et al. |
| 6,356,586 | B1 | 3/2002 | Krishnamoorthy et al. |
| 6,363,124 | B1 | 3/2002 | Cochran |
| 6,411,341 | B1 | 6/2002 | De Haan et al. |
| 6,411,659 | B1 | 6/2002 | Liu et al. |
| 6,415,002 | B1 | 7/2002 | Edwards et al. |
| 6,421,378 | B1 | 7/2002 | Fukuoka et al. |
| 6,430,287 | B1 * | 8/2002 | Rao ..................... 379/406.08 |
| 6,438,164 | B2 | 8/2002 | Tan et al. |
| 6,452,639 | B1 | 9/2002 | Wagner et al. |
| 6,466,615 | B1 * | 10/2002 | Song ......................... 375/232 |
| 6,466,630 | B1 | 10/2002 | Jensen |
| 6,483,872 | B2 | 11/2002 | Nguyen |
| 6,490,007 | B1 | 12/2002 | Bouillet et al. |
| 6,493,409 | B1 | 12/2002 | Lin et al. |
| 6,507,626 | B1 | 1/2003 | Limberg |
| 6,535,553 | B1 | 3/2003 | Limberg et al. |
| 6,553,398 | B2 * | 4/2003 | Capofreddi ................. 708/319 |
| 6,570,919 | B1 | 5/2003 | Lee |
| 6,573,948 | B1 | 6/2003 | Limberg |
| 6,611,555 | B2 | 8/2003 | Smith et al. |
| 6,665,695 | B1 | 12/2003 | Brokish et al. |
| 6,724,844 | B1 | 4/2004 | Ghosh |
| 6,734,920 | B2 | 5/2004 | Ghosh et al. |
| 6,775,334 | B1 * | 8/2004 | Liu et al. .................... 375/341 |
| 6,798,832 | B1 * | 9/2004 | Nakata et al. .............. 375/233 |
| 6,829,298 | B1 | 12/2004 | Abe et al. |
| 2001/0048723 | A1 | 12/2001 | Oh |
| 2002/0024996 | A1 | 2/2002 | Agazzi et al. |
| 2002/0051498 | A1 | 5/2002 | Thomas et al. |
| 2002/0136329 | A1 | 9/2002 | Liu et al. |
| 2002/0154248 | A1 | 10/2002 | Wittig et al. |
| 2002/0172276 | A1 | 11/2002 | Tan et al. |
| 2002/0175575 | A1 | 11/2002 | Birru |
| 2002/0186762 | A1 | 12/2002 | Xia et al. |
| 2002/0191716 | A1 | 12/2002 | Xia et al. |
| 2003/0058967 | A1 | 3/2003 | Lin et al. |
| 2003/0206600 | A1 | 11/2003 | Vankka |
| 2004/0057538 | A1 | 3/2004 | Sathiavageeswaran et al. |

FOREIGN PATENT DOCUMENTS

| | | |
|---|---|---|
| EP | 0 752 185 B1 | 7/2002 |
| WO | WO 00/27033 | 5/2000 |
| WO | WO 00/27066 | 5/2000 |
| WO | WO 01/01650 A1 | 1/2001 |
| WO | WO 01/13516 A2 | 2/2001 |
| WO | WO 01/43310 A2 | 6/2001 |
| WO | WO 01/43384 A2 | 6/2001 |

OTHER PUBLICATIONS

De Haan et al. "De-Interlacing of Video Data", IEEE Transactions on Consumer Electronics, vol. 43. No. 3, pp. 819-824 (Aug. 1997).

Wang et al. "Time-Recursive DeInterlacing for IDTV and Pyramid Coding", Elsevier Science Publishers B. V., vol. 2, No. 3, pp. 365-374 (Oct. 1990).

Demodulation of Cochannel QAM Signals (continued); Error Detection/Correction; pp. 1-3, http://www.appsig.com/papers/1813f/813f_4.html.

Demodulation of Cochannel QAM Signals (continued); Simulation Results; pp. 1-6; http://www.appsig.com/papers/1813f/813f_5.html.

* cited by examiner (a) transversal filter  (b) transposed filter

TRANSPOSED STRUCTURE FOR A DECISION FEEDBACK EQUALIZER COMBINED WITH A TRELLIS DECODER

CLAIM OF PRIORITY

This application claims priority from U.S. Provisional Patent Applications Nos. 60/370,380 filed Apr. 5, 2002 and 60/370,413 filed Apr. 5, 2002.

BACKGROUND

Equalizers are an important element in many diverse digital information applications, such as voice, data, and video communications. These applications employ a variety of transmission media. Although the various media have differing transmission characteristics, none of them is perfect. That is, every medium induces variation into the transmitted signal, such as frequency-dependent phase and amplitude distortion, multi-path reception, other kinds of ghosting, such as voice echoes, and Rayleigh fading. In addition to channel distortion, virtually every sort of transmission also suffers from noise, such as additive white gausian noise ("AWGN"). Equalizers are therefore used as acoustic echo cancelers (for example in full-duplex speakerphones), video deghosters (for example in digital television or digital cable transmissions), signal conditioners for wireless modems and telephony, and other such applications.

One important source of error is intersymbol interference ("ISI"). ISI occurs when pulsed information, such as an amplitude modulated digital transmission, is transmitted over an analog channel, such as, for example, a phone line or an aerial broadcast. The original signal begins as a reasonable approximation of a discrete time sequence, but the received signal is a continuous time signal. The shape of the impulse train is smeared or spread by the transmission into a differentiable signal whose peaks relate to the amplitudes of the original pulses. This signal is read by digital hardware, which periodically samples the received signal.

Each pulse produces a signal that typically approximates a sinc wave. Those skilled in the art will appreciate that a sinc wave is characterized by a series of peaks centered about a central peak, with the amplitude of the peaks monotonically decreasing as the distance from the central peak increases. Similarly, the sinc wave has a series of troughs having a monotonically decreasing amplitude with increasing distance from the central peak. Typically, the period of these peaks is on the order of the sampling rate of the receiving hardware. Therefore, the amplitude at one sampling point in the signal is affected not only by the amplitude of a pulse corresponding to that point in the transmitted signal, but by contributions from pulses corresponding to other bits in the transmission stream. In other words, the portion of a signal created to correspond to one symbol in the transmission stream tends to make unwanted contributions to the portion of the received signal corresponding to other symbols in the transmission stream.

This effect can theoretically be eliminated by proper shaping of the pulses, for example by generating pulses that have zero values at regular intervals corresponding to the sampling rate. However, this pulse shaping will be defeated by the channel distortion, which will smear or spread the pulses during transmission. Consequently, another means of error control is necessary. Most digital applications therefore employ equalization in order to filter out ISI and channel distortion.

Generally, two types of equalization are employed to achieve this goal: automatic synthesis and adaptation. In automatic synthesis methods, the equalizer typically compares a received time-domain reference signal to a stored copy of the undistorted training signal. By comparing the two, a time-domain error signal is determined that may be used to calculate the coefficient of an inverse function (filter). The formulation of this inverse function may be accomplished strictly in the time domain, as is done in Zero Forcing Equalization ("ZFE") and Least Mean Square ("LMS") systems. Other methods involve conversion of the received training signal to a spectral representation. A spectral inverse response can then be calculated to compensate for the channel distortion. This inverse spectrum is then converted back to a time-domain representation so that filter tap weights can be extracted.

In adaptive equalization the equalizer attempts to minimize an error signal based on the difference between the output of the equalizer and the estimate of the transmitted signal, which is generated by a "decision device." In other words, the equalizer filter outputs a sample, and the decision device determines what value was most likely transmitted. The adaptation logic attempts to keep the difference between the two small. The main idea is that the receiver takes advantage of the knowledge of the discrete levels possible in the transmitted pulses. When the decision device quantizes the equalizer output, it is essentially discarding received noise. A crucial distinction between adaptive and automatic synthesis equalization is that adaptive equalization does not require a training signal.

Error control coding generally falls into one of two major categories: convolutional coding and block coding (such as Reed-Solomon and Golay coding). At least one purpose of equalization is to permit the generation of a mathematical "filter" that is the inverse function of the channel distortion, so that the received signal can be converted back to something more closely approximating the transmitted signal. By encoding the data into additional symbols, additional information can be included in the transmitted signal that the decoder can use to improve the accuracy of the interpretation of the received signal. Of course, this additional accuracy is achieved either at the cost of the additional bandwidth necessary to transmit the additional characters, or of the additional energy necessary to transmit at a higher frequency.

A convolutional encoder comprises a K-stage shift register into which data is clocked. The value K is called the "constraint length" of the code. The shift register is tapped at various points according to the code polynomials chosen. Several tap sets are chosen according to the code rate. The code rate is expressed as a fraction. For example, a ½ rate convolutional encoder produces an output having exactly twice as many symbols as the input. Typically, the set of tapped data is summed modulo-2 (i.e., the XOR operation is applied) to create one of the encoded output symbols. For example, a simple K=3, ½ rate convolutional encoder might form one bit of the output by modulo-2-summing the first and third bits in the 3-stage shift register, and form another bit by modulo-2-summing all three bits.

A convolutional decoder typically works by generating hypotheses about the originally transmitted data, running those hypotheses through a copy of the appropriate convolutional encoder, and comparing the encoded results with the encoded signal (including noise) that was received. The decoder generates a "metric" for each hypothesis it considers. The "metric" is a numerical value corresponding to the degree of confidence the decoder has in the corresponding hypothesis. A decoder can be either serial or parallel—that is, it can pursue either one hypothesis at a time, or several.

One important advantage of convolutional encoding over block encoding is that convolutional decoders can easily use "soft decision" information. "Soft decision" information essentially means producing output that retains information about the metrics, rather than simply selecting one hypothesis as the "correct" answer. For an overly-simplistic example, if a single symbol is determined by the decoder to have an 80% likelihood of having been a "1" in the transmission signal, and only a 20% chance of having been a "0", a "hard decision" would simply return a value of 1 for that symbol. However, a "soft decision" would return a value of 0.8, or perhaps some other value corresponding to that distribution of probabilities, in order to permit other hardware downstream to make further decisions based on that degree of confidence.

Block coding, on the other hand, has a greater ability to handle larger data blocks, and a greater ability to handle burst errors.

The following is a description of an improvement upon a combined trellis decoder and decision feedback equalizer, as described in U.S. patent application Ser. No. 09/876,547, filed Jun. 7, 2001, which is hereby incorporated herein in its entirety.

Additional background information is contained in the concurrently-filed U.S. utility patent application entitled, "Synchronization Symbol Re-Insertion for a Decision Feedback Equalizer Combined with a Trellis Decoder," which is also hereby incorporated herein in its entirety.

SUMMARY OF THE INVENTION

In a first embodiment, the present invention provides a DFE comprising a series of cascaded fast-feedback pipes. Each fast-feedback pipe comprises: a filter input; a control input; a data input; a multiplexed tap coefficient input; a reuse clock, a multiplier, a multiplexer, a series of data registers, a final data register, and an adder. The reuse clock has a reuse clock frequency that is greater than the symbol clock frequency, and determines the clock period for all other components in the reuse pipe. The multiplier has as input the data input and the multiplexed tap coefficient input, and has as output a multiplier output. The multiplexer has as input the filter input, the control input, and an adder output. The multiplexer also has a multiplexer output. The multiplexer is configured to pass the filter input to the multiplexer output when the control input is in a first state, and to pass the adder output to the multiplexer output when the control input is in a second state. The series of data registers has as input the multiplexer output, and has as output a delay line output. Each of the series of data registers has a single reuse clock period delay. The adder has as inputs the delay line output and the multiplier output, and has as output the adder output. The final data register has as input the adder output and the control input, and also has a final output. The final data register is configured to latch the adder output only when the control input is in the first state. The multiplexed tap coefficient input inputs tap coefficients. Each of the reuse pipes receives a common control input and a common data input, and each of the reuse pipes after a first reuse pipe has as its filter input the final output from a prior reuse pipe.

In a second embodiment, the present invention provides an equalizer filter having a plurality of taps, each tap comprising a multiplier and an adder, and wherein a common input data symbol is simultaneously multiplied by a majority of the plurality of taps' multipliers.

In a third embodiment, the present invention provides a decision feedback equalizer combined with a trellis decoder having only a transposed filter structure.

In a fourth embodiment, the present invention provides a fast-feedback reuse pipe.

In a fifth embodiment, the present invention provides a DFE for interpreting a digital television signal. The fifth embodiment DFE comprises a trellis decoder and a plurality of sub-filter pipelines. The trellis decoder has a plurality of stages and decoding banks. Each of the plurality of sub-filter pipelines is fed intermediate decoded symbols of one of the stages in a trace-back chain of a current decoding bank. The DFE output is formed by summing the plurality of sub-filter pipelines.

BRIEF DESCRIPTION OF THE DRAWINGS

Although the characteristic features of this invention will be particularly pointed out in the claims, the invention itself, and the manner in which it may be made and used, may be better understood by referring to the following descriptions taken in connection with the accompanying figures forming a part hereof.

DETAILED DESCRIPTION OF THE PREFERRED EMBODIMENT

For the purposes of promoting an understanding of the principles of the invention, reference will now be made to the preferred embodiment and specific language will be used to describe the same. It will nevertheless be understood that no limitation of the scope of the invention is thereby intended. Such alternations and further modifications in the invention, and such further applications of the principles of the invention as described herein as would normally occur to one skilled in the art to which the invention pertains, are contemplated, and desired to be protected.

The present invention provides a transposed structure for a decision feedback equalizer ("DFE") that can be used, for example, with a combined DFE and trellis decoder, as taught by U.S. patent application Ser. No. 09/884,256 (which is hereby incorporated in its entirety). The transposed structure permits extremely fast and effective ghost cancellation, so that the equalizer provides a high quality signal resolution in even during severe noise and channel distortion. Consequently, a digital receiver, such as are used in a digital television or cell phone, will have clear reception under conditions where prior digital equipment would completely fail.

The transposed structure of the present invention provides a feedback ghost estimation in only a single symbol clock cycle. In addition to the obvious advantage of a fast ghost estimation, this also provides a ghost estimation that is independent of the number of taps in the transposed pipeline. Prior art transposed filter structures suffer more severe time problems as the length of the equalizer increases.

The transposed structure of the present invention also permits the use of a fast-feedback reuse circuit, described in detail hereinbelow. The fast-feedback reuse circuit provides a feedback loop that can complete ghost cancellation for the next symbol in only a single symbol clock period. Furthermore, it can complete the final feedback calculation in only a fraction of a symbol clock cycle using a separate, higher frequency clock, termed a "reuse clock." The fast-feedback reuse circuit also permits logic sharing, whereby the number of logical components necessary to complete ghost cancellation calculations can be substantially reduced, with a corresponding reduction in the cost of the hardware.

It will be appreciated that a DFE can have N×D+M taps, where N is the number of inner decoding stages, D is the number of banks in the trellis decoder, and M is the number of taps after the final decoded symbol of the trellis decoder. When the DFE is implemented in a traditional transverse structure, all N×D+M decoded symbols are fed into the DFE. The latter portion of such a DFE, consisting of the final M taps, takes in a decoded symbol from an accurate delay line (that is, a delay line that provides the same output in a given clock cycle as the input during a previous clock cycle). Thus, the latter portion of such a DFE is not time-critical. Consequently, it can be implemented in either a traditional transverse structure or a transposed pipeline, as disclosed herein, without difficulty.

However, the first portion of such a DFE, consisting of the first N×D taps, takes as input the intermediate decoded symbols from the trellis decoder. Consequently, it is time-critical. The transposed DFE structure shown in FIG. 1B, and indicated generally at 150, resolves this problem.

Figure 1:
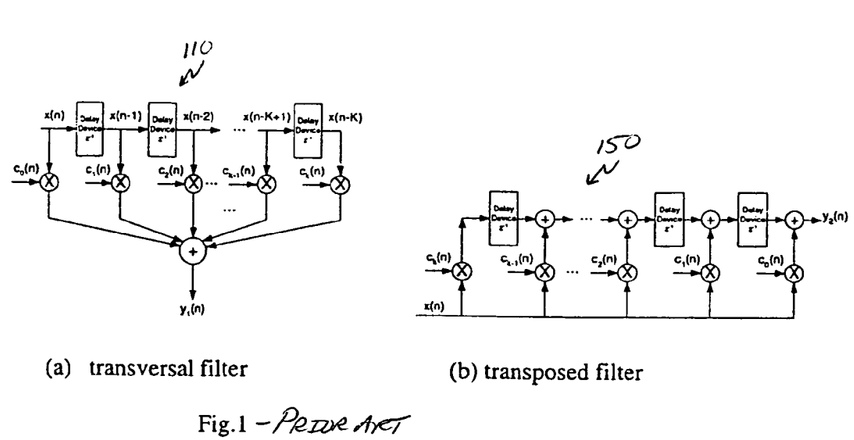
FIG. 1A is a diagram of a prior art transverse filter structure.
FIG. 1B is a diagram of a transposed filter structure suitable for use in a DFE according to the present invention.

It will be appreciated that both feed-forward equalizers ("FFE") and DFEs include a filter. Typically, this filter is implemented in a transverse structure as shown in FIG. 1A, indicated generally at 110. The output of the (K+1)-tap transverse filter 110 given by:

$$y_1(n) = \sum_{k=0}^{K} c_k(n)x(n-k) \quad \text{(Eq. 1)}$$

where x(n) is the input symbol at symbol clock period n, and where $c_k(n)$ is the coefficient of the $k^{th}$ tap in the $n^{th}$ symbol clock period.

It will be appreciated that, when given the same inputs, the output of the (K+1)-tap transposed filter 150 is given by:

$$y_2(n) = \sum_{k=0}^{K} c_k(n-k)x(n-k) \quad \text{(Eq. 2)}$$

When the coefficients of the filter are fixed, $y_2(n)$ is equal to $y_1(n)$ and the transposed filter is identically equivalent to the transverse filter. On the other hand, when the coefficients vary over time, $y_2(n)$ is not necessarily equal to $y_1(n)$, and, therefore, the transposed filter is not precisely equivalent to the transverse filter. However, because the tap coefficients in the equalizer change gradually, and slowly on a symbol-by-symbol basis, if the total tap number K is small, the increase and decrease of the taps is very small within a K-symbol neighborhood, and can be ignored. In this case, a given value of the Kth tap is approximately equal to its value K symbol clock cycles before:

$$c_k(n) \approx c_k(n-k), \quad \text{(Eq. 3)}$$

where k=1, 2, ..., K.

Thus, for a small number of taps, during adaptation operation of the equalizer when the transposed and transverse structures are functionally equivalent, the transposed structure can be employed without practical degradation of the equalizer's performance.

Figure 2:
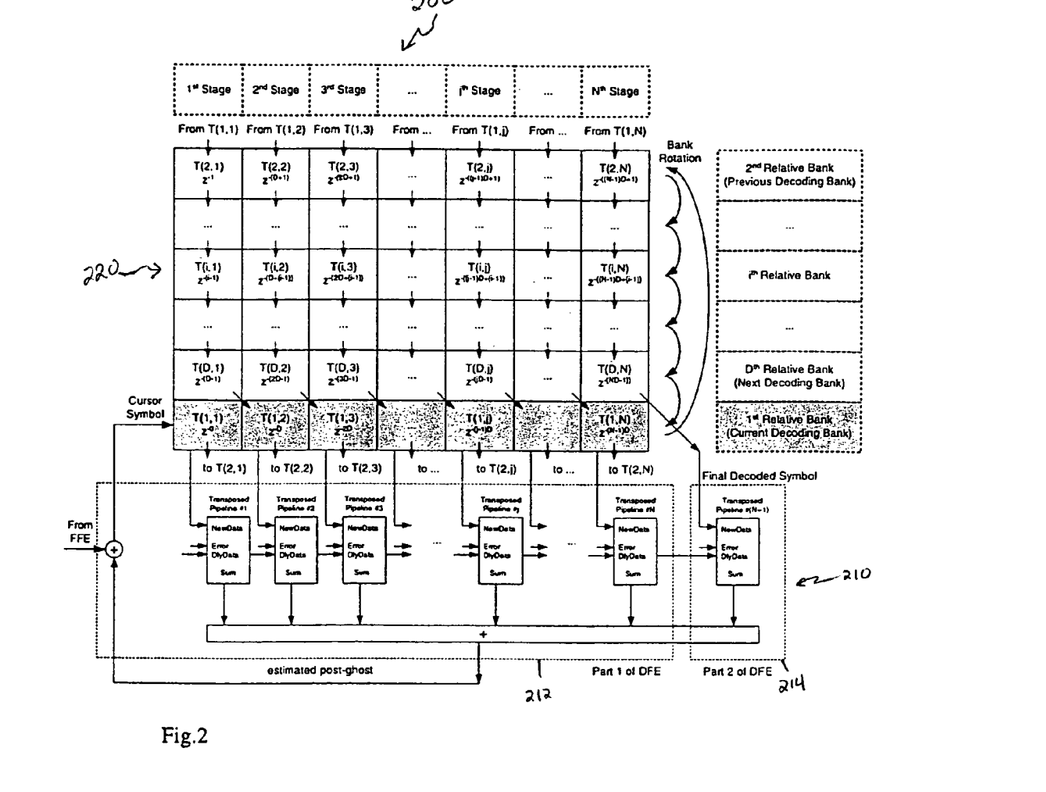
FIG. 2 is a diagram of certain features of a combined DFE and trellis decoder according to the present invention, employing a transposed filter structure.

FIG. 2 illustrates certain features of a first embodiment DFE combined with a trellis decoder according to the present invention, indicated generally at 200. The DFE is indicated generally at 210, and consists of the first, (N×D)-tap part 212, and the 2 d, M-tap part, 214. The trellis decoder is indicated generally at 220, with the N stages being shown as columns and the D decoding banks as rows. A trellis decoder having D decoding banks and having N stages stored in the trace-back chain holds N×D inner intermediate decoded symbols. For example, in a trellis decoder of an ATSC receiver D is 12, and there are typically 16 stages, so N is 16. Consequently, a typical ATSC receiver holds 192 inner intermediate decoded symbols in the trellis decoder.

When the DFE 210 is combined with a trellis decoder 220, all N×D inner intermediate decoded symbols held in the trace-back chains in the trellis decoder 220 must be re-arranged into an equivalent N×D symbol delay line in the order they went into the trellis decoder as input, un-decoded symbol samples. This temporal order recovered sequence (the equivalent N×D symbol delay line) can be fed into the DFE 210 to produce the desired ghost estimate. This is illustrated in FIG. 2, by the chain of arrows, which shows the progress of the input symbols as they are clocked through the trellis decoder.

As shown in FIG. 2, the current decoding bank is denoted as "relative bank #1," the previous bank as "relative bank #2," and so on through relative bank #D—which, of course, is also the next decoding bank. It should be noted that the "relative bank" is a different from the absolute bank. Generally, the term "bank" or "trellis bank" refers to an absolute bank. An absolute bank is a particular bank in a trellis encoder or decoder that encodes, decodes, and holds all information regarding a particular symbol sub-sequence. During encoding or decoding, trellis coders and decoders rotate through the absolute banks. The term "relative bank" refers to these banks based on their relative position to the pointer during this bank rotation process. Whenever the trellis encoder or decoder rotates to a given absolute bank, it becomes the "current bank," or "relative bank #1."

T(i, j) denotes the cell containing the intermediate decoded symbol stored in the $j^{th}$ stage of the trace-back chain, in relative bank #i, $1 \leq i \leq D$, $1 \leq j \leq N$. The symbol T(i, j) incurs (j−1)D+(i−1) symbol delays after the cursor symbol that has the same time stamp as the current input symbol to the trellis decoder. The data stored in the same stage of the trace-back chains (D symbols per stage) of all banks composes a continuous delay line. It will be appreciated that in the trellis decoder only the data held in the trace-back chain of the current decoding bank may change their values during the trace-back process. In other words, the data in all cells are not modified when they are moved from the 1st relative bank (i.e. the current bank) to the last relative bank (i.e. the $D^{th}$ bank, or the next bank), and, therefore, each sequence of D symbols composes an accurate delay line, wherein the data is continuously delayed without modification. All together there are N such sequences in an N-stage trellis decoder. On the other hand, the data stored in different stages do not compose an accurate delay line, because these data can change their values. Thus, the N×D inner intermediate decoded symbols are divided into N accurate delay lines, each covering D taps, and made up of the inner intermediate decoded symbols of the same stage of the respective trace-back chains in all banks. In each accurate delay line the data from the 1st relative bank is just the desired data symbol of the 1st tap, and so on to the last relative bank, its value is the data symbol of the Dth tap. This can be described by the syntax:

```
Equivalent_N x D_symbol_delay_line ( )
{
    for (j=1; j<N+1; j++)
        accurate_delay_line (j);
}
and each accurate delay line is:
    accurate_delay_line (j)
{
    for (i=1; i<D+1; i++)
        T(i,j);
}
```

As stated above, each filter that is fed by an accurate delay line can be implemented by a transposed structure. The 1st part of the DFE 210 combined with the trellis decoder 212 (consisting of the first N×D inner intermediate decoded symbols), can be implemented in N transposed pipelines, each covering D taps and taking as input one of the N inner intermediate decoded symbols stored in the trace-back chain of the current decoding bank. The outputs from all transposed pipelines are summed together to give out ghost estimation coming from the first part of the DFE 210 combined with the trellis decoder, as shown in FIG. 2.

It will be appreciated that the syntax recited above does not cover the "corner cases" that develop when non-data symbols are read in, including, for example, the symbols of the segment and field sync signals in a digital television signal. At least one means of handling such corner cases is taught in the concurrently filed U.S. patent application entitled "Synchronization Symbol Re-insertion for a Decision Feedback Equalizer Combined with a Trellis Decoder," which is hereby incorporated in its entirety.

In the case of an ATSC receiver, there are 12 trellis banks, and typically there are 16 decoding stages. A DFE according to the present invention fitting to 16 decoding stages includes 16 transposed pipelines. The data symbol in cell T(1, 1) (as illustrated in FIG. 2), that is, the intermediate decoded result held in the 1st stage of the current decoding bank, feeds into the 1st transposed pipeline. Likewise, the data symbol in cell T(1, 2) feeds into the 2 d transposed pipeline, and the intermediate decoded result held in the 3 d stage of the current decoding bank feeds into the 3 d transposed pipeline, and so on through all 16 stages and transposed pipelines. Each pipeline calculates the ghost estimation coming from ghosts in a delay range of 12 symbol clock cycles. All 16 pipelines are summed together to obtain the ghost estimation from the full 192 symbol clock cycles. The final decoded symbol from the trellis decoder feeds the 2d, M-tap portion of the DFE (whether implemented as a transposed or transverse structure). Finally, the estimated ghost of the first part of the DFE (the 192 symbols) is added to that of the 2d part of the DFE (the remaining M symbols), to obtain the complete ghost estimation from the DFE.

It will be appreciated that, in such a 16×12+M DFE structure, the number of taps in each transposed pipeline, K, is 12 in Equation 3 above. Consequently, the approximation of Equation 3 works extremely well, because the tap coefficients change very little over 12 symbol clock cycles (if they change at all). Consequently, there is little or no loss of performance caused by the approximation in the transposed pipeline calculation.

Figure 3:
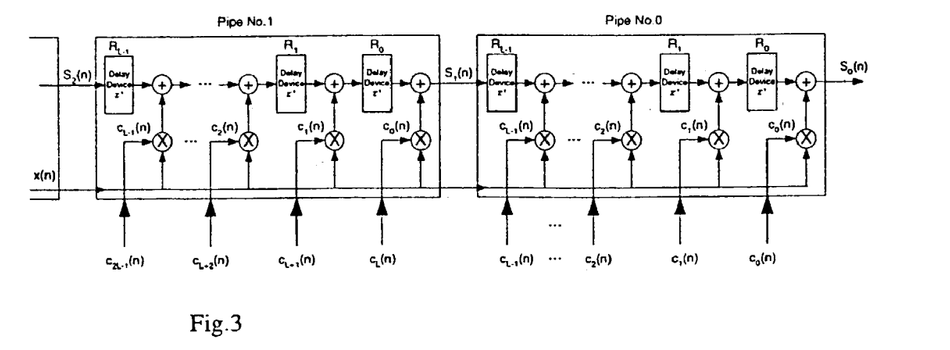
FIG. 3 is a diagram of additional details of a first embodiment DFE according to the present invention, wherein the filter structure is implemented as a series of cascaded pipes.

As discussed above, the timing-critical part of each transposed pipeline of the DFE of FIG. 2 is its transposed filter. In certain embodiments, a DFE according to the present invention includes the transposed filter implemented as a series of cascaded pipes, as shown in FIG. 3, and indicated generally at 300 (showing only the two rightmost pipes, labeled Pipe No. 0 and Pipe No. 1). As shown in FIG. 3, the output of pipe No. 0 is $S_0(n)$, the output of pipe No. 1 is $S_1(n)$, and so on. The output of each pipe is the input to the next pipe rightwards, so pipe No. 0 receives as input $S_1(n)$. The output $S_0(n)$ is the final output of the transposed pipeline.

Each pipe covers a group of consecutive taps, denoted by L in FIG. 3. Thus, there are L data registers in each pipe, shown as $R_0$, $R_1$, and so on to $R_{L-1}$, inclusive. Each group of L consecutive taps feeds into one of the pipes, the first tap group starting with $c_0(n)$ through $c_{L-1}(n)$, feeding into pipe No. 1. The next tap group feeds into pipe No. 1, and so on, as shown in FIG. 3.

Figure 4:
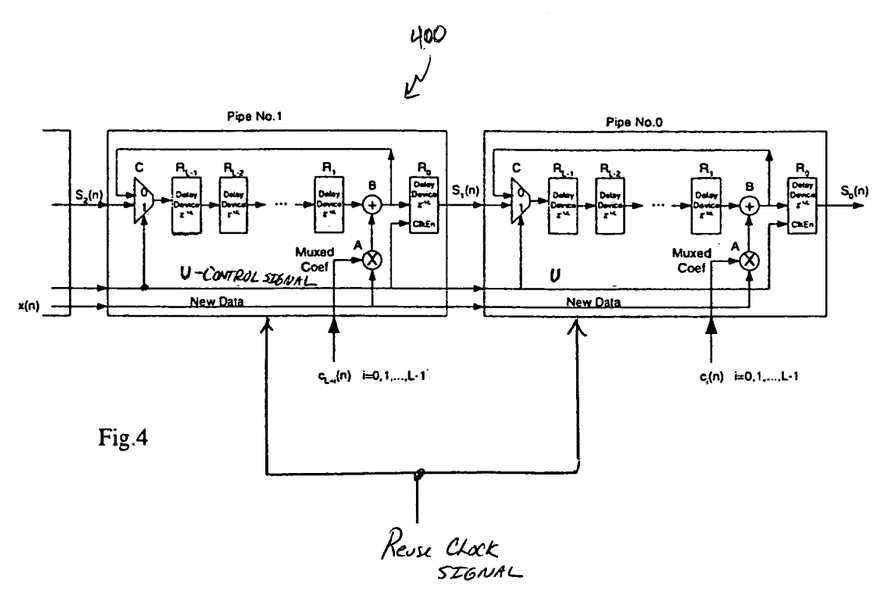
FIG. 4 is a diagram of additional details of a preferred embodiment DFE according to the present invention, wherein the filter structure is implemented as a series of fast-feedback reuse pipes.

In the preferred embodiment, the transposed filter is implemented as a fast-feedback reuse pipe structure, such as the one shown in FIG. 4, and indicated generally at 400 (again showing only the two rightmost reuse pipes). A fast-feedback reuse pipe is a structure that can be used to build up a filter, having a separate clock which operates at a higher frequency than the symbol clock. A preferred embodiment reuse pipe comprises L data registers, again shown as $R_0$, $R_1$, and so on through $R_{L-1}$ in FIG. 4, a single multiplier (shown as A), an adder (shown as B), and a 2:1 multiplexer (shown as C). The taps within the same reuse pipe share the computation logic, mainly an adder and a multiplier. It will therefore be appreciated that the number of taps in the reuse pipe is the number of times the adder and multiplier are reused in each calculation.

The multiplexer C in each reuse pipe switches that pipe's input between the output of the preceding reuse pipe and the output of the adder B in the current reuse pipe. For example, in pipe No. 0, the multiplexer C switches between $S_1(n)$, the output of pipe No. 1, and the sum from adder B, as described in further detail hereinbelow. The output of the multiplexer C is delayed by data register $R_{L-1}$; data register $R_{L-1}$'s output is delayed by data register $R_{L-2}$, and so on through data register $R_1$. Within each reuse pipe, the L tap coefficients and the L data symbols are input consecutive to the multiplier A by a time-domain multiplexing in L reuse clock cycles. The output product of each pair of tap coefficient and data symbol from the multiplier A is added to the data register $R_1$ by adder B, and the resulting sum is latched into data register $R_0$ in the first reuse clock cycle of a given symbol clock cycle, and into $R_{L-1}$ in other reuse clock cycles. Since the output of pipe No. 0 is updated, it becomes ready to be summed. All together the N values held by all $R_0$ registers in N transposed pipelines are summed together and the feedback from the DFE 210 is thereby produced. During every symbol clock cycle, the multiplier A creates L delta values, the L data values held by L data registers are updated once by absorbing the delta values when they pass through the adder B one by one.

Because the reuse pipe performs L operations reusing the same multiplier B and adder A as is performed by the L multipliers and adders in the pipes of the DFE shown in FIG. 3, the reuse pipes are clocked by a separate clock, termed a "reuse clock." The reuse clock most naturally has a frequency L-times faster than the symbol clock—that is, in each symbol clock cycle, the reuse clock cycles L times. One of the data registers is updated in each reuse clock cycle. The data registers are updated in a direction reverse to signal flow, i.e., in each reuse pipe, data register $R_0$ is updated first, data register $R_1$ second, and so on through data register $R_{L-1}$, which is updated last.

In the preferred embodiment, the multiplier A and adder B have no reuse clock delay, so the data register $R_0$ is updated in the 1st reuse clock cycle in a symbol clock period. During this reuse clock cycle, and only this reuse clock cycle, the multiplexer C control signal (shown as U in FIG. 4) is asserted, causing the multiplexer C to pass the reuse pipe's input $S_x(n)$, which is thereby latched in data register $R_{L-1}$. The data symbol stored in $R_{L-1}$ is shifted to $R_{L-2}$, and so on through $R_0$. During all other reuse clock cycles the multiplexer C passes the output of the adder B; thus, the remaining L−1 data symbols are updated and cyclically shifted through the data registers (except $R_0$). That is, the symbol from $R_1$ is renewed by adder A and then is latched by $R_{L-1}$, rather than by $R_0$. This computation scheme is scheduled by control signal U. The control signal U is asserted during the first reuse clock cycle, causing the data register $R_0$ to latch the sum output of the adder B; thus, the value of $R_0$ is updated; during other reuse clock cycles $R_0$ remains unchanged while the updated values from adder B are passed through multiplexer C to then be latched by $R_{L-1}$.

It will be appreciated that when each symbol clock cycle (or L reuse clock cycles) is over all data registers keep the updated data values of the L taps in each pipe, as required.

In certain alternative embodiments, the multipliers A and adders B have some reuse clock cycle delays. This causes the data register $R_0$ to be updated in a later reuse clock cycle. In this way, a clock with a frequency greater than L times the symbol clock may be used, and the computation performed by the reuse pipes can be slowed down to reach the desired frequency.

Due to its unique structure, the transposed filter structure 400 completes its first calculation in only a single reuse clock cycle, which will make ready at the same time the feedback of each filter for the required following computations outside the DFE. Meanwhile the transposed DFE is able to use the whole symbol clock cycle, or L reuse clock cycles, to finish all computations required to update all the internal data registers.

Furthermore, the transposed filter, structure 400 permits a reduction in cost of hardware, because of the reduction by a factor of L in the number of adders and multipliers in the filter. Of course, this cost advantage is offset somewhat by the requirement to use higher frequency components, but even with L as low as 4 substantially savings are possible. It will be appreciated that L can advantageously be as high as 12, or even 16.

While the invention has been illustrated and described in detail in the drawings and foregoing description, the description is to be considered as illustrative and not restrictive in character. Only the preferred embodiments, and such alternative embodiments deemed helpful in further illuminating the preferred embodiment, have been shown and described. It will be appreciated that changes and modifications to the forgoing can be made without departing from the scope of the following claims.

We claim:

1. A decision feedback equalizer having a symbol clock frequency, the decision feedback equalizer comprising a series of cascaded fast-feedback pipes, each fast-feedback pipe comprising:
   a filter input, a control input, a data input, and a multiplexed tap coefficient input;
   a reuse clock having a reuse clock frequency that is greater than the symbol clock frequency, the reuse clock determining the clock period for all other components in the fast-feedback pipes;
   a multiplier, having as input the data input and the multiplexed tap coefficient input, and having a multiplier output;
   a multiplexer having as input the filter input, the control input, and an adder output, the multiplexer also having a multiplexer output, and being configured to pass the filter input to the multiplexer output when the control input is in a first state, and to pass the adder output to the multiplexer output when the control input is in a second state;
   a series of data registers, having as input the multiplexer output, and having as output a delay line output, each of the series of data registers having a single reuse clock period delay;
   an adder, having as inputs the delay line output and the multiplier output, and having as output the adder output;
   a final data register having as input the adder output and the control input, and having a final output, the final data register being configured to latch the adder output only when the control input is in the first state;
   wherein the multiplexed tap coefficient input inputs tap coefficients; and
   wherein each of the fast-feedback pipes receives a common control input and a common data input, and each of the fast-feedback pipes after a first reuse pipe has as its filter input the final output from a prior fast-feedback pipe.

2. The decision feedback equalizer of claim 1, combined with a trellis decoder, wherein the data input to the fast-feedback pipelines is a decoded symbol from a current decoding bank of the trellis decoder.

3. The decision feedback equalizer of claim 1, wherein the series of data registers consists of three data registers.

4. The decision feedback equalizer of claim 1, wherein the series of data registers consists of a number of data registers between 4 and 15, inclusive.

5. The decision feedback equalizer of claim 1, wherein the multiplexed tap coefficient input consists of tap coefficients multiplexed at the reuse clock frequency.

* * * * *